US006115581A

United States Patent [19]

Wu

[11] Patent Number: 6,115,581

[45] Date of Patent: Sep. 5, 2000

[54] APPARATUS FOR COMMUNICATION USING MULTIPLE RADIO PROCESSING MODULES

[75] Inventor: Hsi-Chi Wu, Taipei, Taiwan

[73] Assignee: Eten Information System Co., Ltd., Taiwan

[21] Appl. No.: 09/134,753

[22] Filed: Aug. 17, 1998

[30] Foreign Application Priority Data

Nov. 14, 1997 [TW] Taiwan ................................ 86117030

[51] Int. Cl.[7] ...................................................... H04Q 7/14

[52] U.S. Cl. ........................ 455/31.1; 455/458; 455/37.1; 455/21; 340/311.1

[58] Field of Search ................................. 455/31.1, 31.2, 455/421, 426, 458, 464, 20, 21, 31.3, 37.1, 500, 515, 566, 567, 132, 133, 137, 138; 340/825.72, 825.73, 311.1, 825.44

[56] References Cited

U.S. PATENT DOCUMENTS

| | | | |
|---|---|---|---|
| 4,922,221 | 5/1990 | Sato et al. | 340/311.1 |
| 5,303,400 | 4/1994 | Mogi | 455/186.1 |
| 5,423,057 | 6/1995 | Kuznicki et al. | 455/38.3 |
| 5,450,612 | 9/1995 | Chanroo et al. | 455/38.1 |
| 5,796,338 | 9/1995 | Mardirosian | 340/568 |
| 5,983,086 | 1/2000 | Tsukuda | 455/132 |
| 6,040,738 | 1/2000 | Uchida | 329/302 |

*Primary Examiner*—Fan Tsang
*Assistant Examiner*—Congvan Tran
*Attorney, Agent, or Firm*—Pillsbury Madison & Sutro LLP

[57] ABSTRACT

Apparatus for communication using multiple radio processing modules is disclosed herein. The apparatus for communication mentioned above receives a first radio signal and a second radio signal from a source to acquire a first information and a second information. The first radio signal and the second radio signal is within a first frequency range and a second frequency range respectively. The first message signal and the second message signal are of a baseband range. The first information and the second information are carried by the first message signal and the second message signal respectively. The apparatus for communication mentioned above includes the following devices. A first radio processing module that transfer the first radio signal to generate the first message signal. A second radio processing module that transfers the second radio signal to generate the second message signal. A processing unit processes the first message signal and the second message signal to generate the first information and the second information. The processing unit generates a first alarm signal and a second alarm signal corresponding to the first message signal and the second message signal respectively. The displaying means illustrates the first information and the second information corresponding to first message signal and the second message signal.

15 Claims, 2 Drawing Sheets

APPARATUS FOR COMMUNICATION USING MULTIPLE RADIO PROCESSING MODULES

BACKGROUND OF THE INVENTION

1. Field of the Invention

This invention relates to apparatus for multiple radio frequency communication, and particularly relates to apparatus for using a plurality of radio processing modules to process the signals from various communication channels.

2. Description of the Prior Art

In the traditional beeper or communication system, the receiver of a communication system can only receive the signal in a specific communication channel. When the specific communication channel is occupied by the information from a first source, even though the communication system can process the information from the second source, due to the limitation of the receiver, the communication system can only process the information from the first source. The circuit diagram of the traditional communication system such as a traditional beeper receiving the information from the source is shown in FIG. 1. The demodulator 100 of the traditional communication system receives the radio signal 104 that bearing the information sent by the source 102. The demodulator 100 proceeds with the radio signal 104 to generate the baseband signal 106, thus the frequency of the baseband signal 106 is within the bandwidth of the receiver of the traditional communication system. So only the signal within the bandwidth of the demodulator 100 can be received by the traditional communication system. Because there is only one set of demodulator, the traditional communicational system having only one demodulator is thus named as a single-radio-module communication system. To illustrate the issue resulted from the traditional communication system; the information carried by the signal within the bandwidth of the demodulator 100 is assumed as the first specific information.

The decoding device 108 decodes the baseband signal 106 to generate the digital signal 110, so the specific format used in transmitting the radio signal 106 is converted to a normal format that can be processed by a processor. Then the CPU (central processing unit) 120 processes the digital signal 110 to recreate the message signal that modulated and encoded by the source 102. Because the information is carried by the message signal, thus the information is transmitted from the source to the receiver. The message signal recreated by the CPU 120 is sent to the RAM (random access memory) 125 for storage, and is sent to the displaying device 130 for display.

The issue caused by the traditional communication system mentioned above is the waste of the CPU resource. If the bandwidth of the CPU 120 is larger than the bandwidth of the demodulator 100, and the information occupied the bandwidth of the source 102, then the other information in the other source can not be received by the traditional communication system. The situation mentioned above is caused by the single radio processing module design of the traditional communication system. Due to the bandwidth limitation of the demodulator 100, only the first information transmitted within the bandwidth of the demodulator 100 can be received and processed by the traditional communication system. If there is a second information beyond the range of the bandwidth of the demodulator 100, the second information can not be processed by the traditional communication system. So the single radio processing module design of the traditional communication system wastes the resource of the CPU.

SUMMARY OF THE INVENTION

Because the bandwidth limitation of the demodulator, only the information transmitted within the bandwidth of the demodulator can be received and processed by the traditional communication system. If there is a second information in beyond the range of the bandwidth of the demodulator, the second information can not be processed by the traditional communication system. So the single radio processing module design of the traditional communication system wastes the resource of the CPU. To increase the efficiency in communication, the apparatus using multiple radio-processing modules is presented by the present invention.

The apparatus for communication mentioned above receives a first radio signal and a second radio signal from a source to acquire a first information and a second information. The first radio signal and the second radio signal is within a first frequency range and a second frequency range respectively. The first message signal and the second message signal are of a baseband range, and the baseband range is lower than the first frequency range as well as the second frequency range. The first information and the second information are carried by the first message signal and the second message signal respectively.

The apparatus for communication mentioned above includes the following devices. A first radio processing module that transfer the first radio signal to generate the first message signal. A second radio processing module that transfers the second radio signal to generate the second message signal. Processing unit processes the first message signal and the second message signal to generate the first information and the second information. The processing unit generates a first alarm signal and a second alarm signal corresponding to the first message signal and the second message signal respectively. The displaying means illustrates the first information and the second information corresponding to first message signal and the second message signal.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

To overcome the inefficiency issue of the traditional communicational system, the present invention provides apparatus for receiving information from different sources transmitting radio signals of different frequency range. So the communication system according to the preferred embodiment of the present invention can simultaneously receiving and processing the first information from the first source and the second information from the second source. The communication system according to the preferred embodiment of the present invention having at least two radio processing modules can process the information from different sources. In order to process the information efficiently, the information can be transmitted in different sources simultaneously. Then the communication system according to the preferred embodiment of the present invention can receive the first information by one radio-processing module, and receive the second information by the other radio-processing module.

Figure 1:
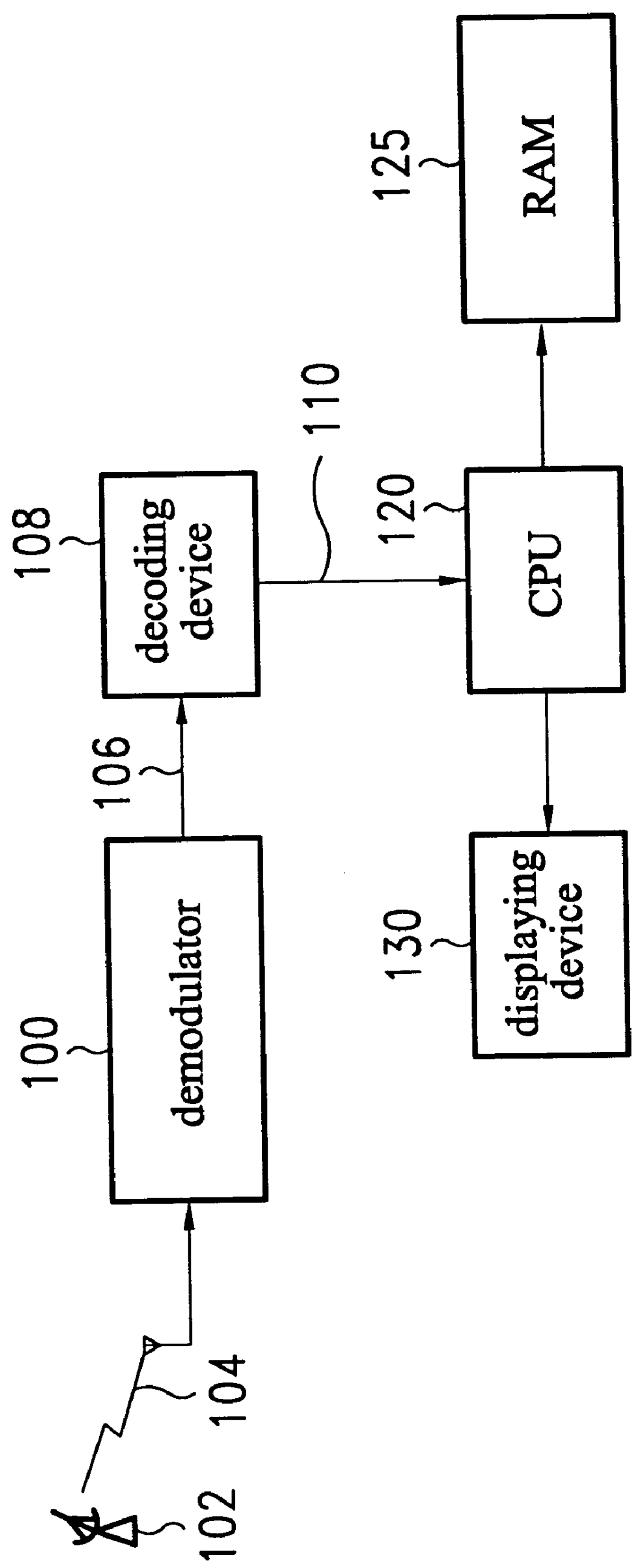
FIG. 1 illustrates the functional blocks of the traditional beeper.
Figure 2:
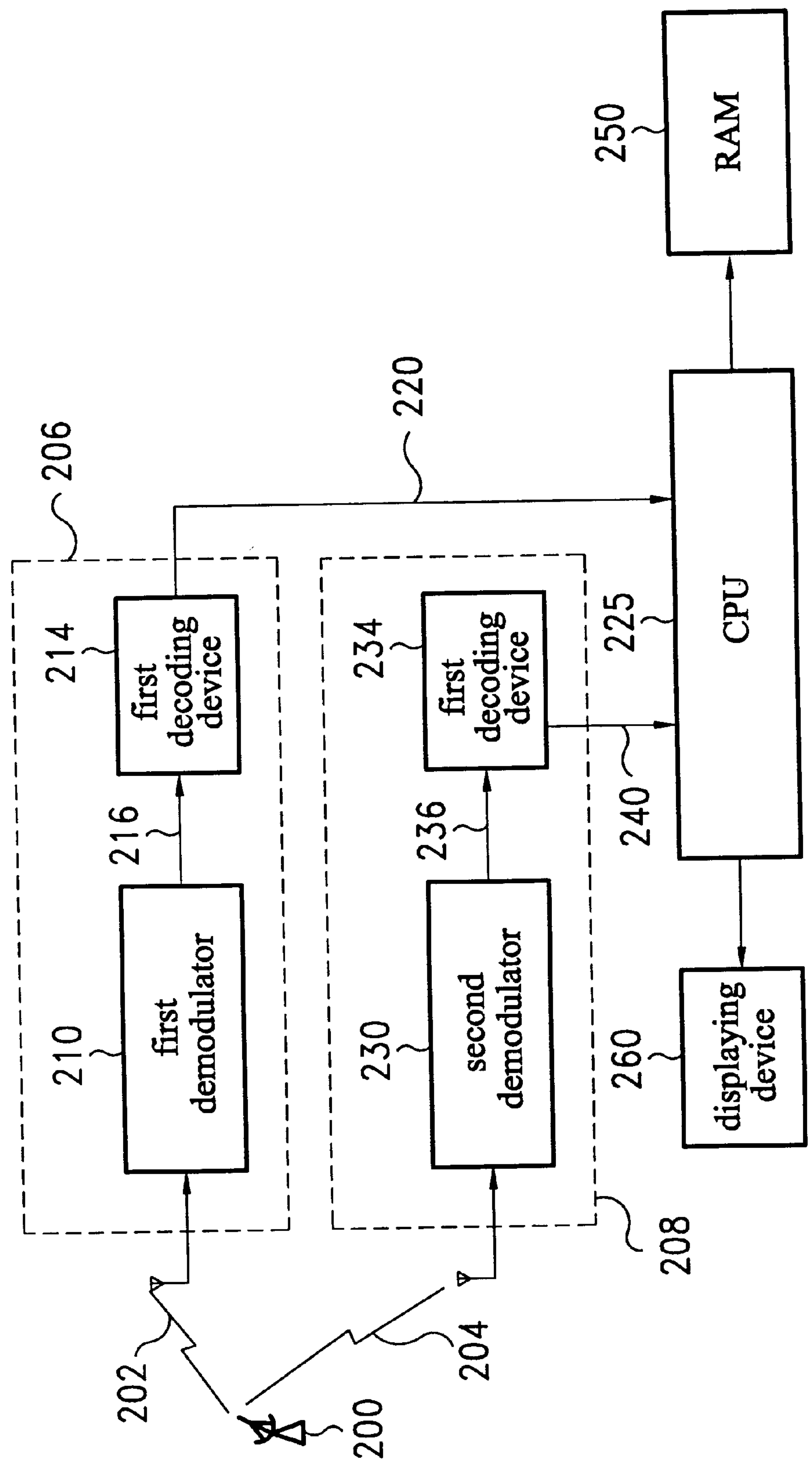
FIG. 2 illustrates the functional blocks of the communication system according to the preferred embodiment of the present invention.

The configuration of the circuit diagram is shown in FIG. 2, in which the communicational system according to the preferred embodiment of the present invention has at least two radio processing modules coupling to the CPU. In addition, different radio processing modules can receive radio signal of different frequency ranges.

When the first information in the source 200 is carried by the first radio signal 202, and the first channel is occupied by the first information, the second radio signal 204 bearing the second information is transmitted by the source 200 by way of the second channel. The first radio signal and the second radio signal are both the electromagnetic wave. In addition, the first channel and the second channel are the space that the electromagnetic wave can propagate in the first channel and the second channel.

The first radio processing module 206 is used to receive the first radio signal 202, and the second radio processing module 208 is used to receive the second radio signal 204. The first radio-processing module 206 includes the first demodulator 210 and the first decoding device 214. Because the bandwidth occupied by the first radio signal 202 is within the bandwidth of the first demodulator 210, so the first radio processing module 206 can receive the first radio signal 202 to acquire the first information carried by the first radio signal 202.

The first demodulator 210 proceeds with the first radio signal 202 to transfer the frequency of the first radio signal 202 from the radio range to the baseband range, thus the first bsaeband signal 216 can be processed by the first decoding device 214. The first decoding device 214 decodes the first bsaeband signal 216 to generate the first information-bearing signal—the first message signal 220. For the transmission in the electromagnetic wave, the first message signal 220 bearing the first information is encoded and modulated by the source 200. After the process of the first radio processing module 206, the first message signal 220 bearing the first information is acquired and is fed to the CPU (central processing unit) 225.

In the other respect, the second radio-processing module 208 of the communication system according to the preferred embodiment of the present invention includes the second demodulator 230 and the second decoding device 234. Because the bandwidth occupied by the second radio signal 204 is within the bandwidth of the second demodulator 230, so the second radio processing module 208 can receive the second radio signal 204 to acquire the second information carried by the second radio signal 204.

The second demodulator 230 proceeds with the second radio signal 204 to transmit the frequency of the second radio signal 204 from the radio range to the baseband range, thus the second bsaeband signal 236 can be processed by the second decoding device 234. The second decoding device 234 decodes the bsaeband signal 236 to generate the second information-bearing signal—the second message signal 240. For the transmission in the electromagnetic wave, the second information carried by the second message signal 240 is encoded and modulated by the source 200. After the process of the second radio processing module 208, the second message signal 240 bearing the second information is acquired and is fed to the CPU (central processing unit) 225.

Because the first message signal 220 and second message signal 240 are processed by the CPU 225 using time division multiplexing. The first information acquired from the first message signal 220 and the second information acquired from the second message signal 240 are sent to the RAM (random access memory) 250 respectively for storage. In addition, when an information is sent from the CPU 225 to the RAM 250, the CPU 225 also send an alarm signal to the displaying device 260 to inform the user of the arrival of the information. In the preferred embodiment of the present invention, the first message signal 220 and the second message signal 240 arrive at the CPU 225, so two alarm signals are sent from the CPU 225 to the displaying device 260. Thus two alarms are given by the communication system according to the preferred embodiment of the present invention.

In the preferred embodiment of the present invention, the first radio-processing module 206 includes the first demodulator 210 and the first decoding device 214. Similarly, the second radio-processing module 208 includes the second demodulator 230 and the second decoding device 234. The two decoding devices used in the individual radio-processing module are in accordance with the preferred embodiment of the present invention. If the bandwidth of a decoding device is enough for adapting the output signal of the first demodulator 210 and the second demodulator 230, the forgoing decoding device can be used to substitute the first decoding device 214 and the second decoding device 234. In other words, as long as the communication system can process the input radio signal of different frequency ranges, the communication mentioned above is the modification of the preferred embodiment of the present invention. The feature of the present invention is the multiple radio processing modules of a communication system, so the present invention is not confined to the circuit diagram shown in the drawings of the specification of the present invention. The displaying device used in the preferred embodiment of the present invention is a liquid crystal display (LCD).

As will be understood by persons skilled in the art, the foregoing preferred embodiment of the present invention is illustrative of the present invention rather than limiting the present invention. Having described the invention in connection with a preferred embodiment, the modification will now suggest itself to those skilled in the art. While the preferred embodiment of the invention has been illustrated and described, it will be appreciated that various changes can be made therein without departing from the spirit and scope of the invention.

What is claimed is:

1. Apparatus for communication, said apparatus receiving a first radio signal and a second radio signal being used to acquire a first information and a second information, said apparatus comprising:

a first radio processing module for transferring said first radio signal to generate a first message signal, said first radio signal being within a first frequency range, said first message signal being of a baseband range, a highest frequency component of said baseband range being lower than a lowest frequency component of said first frequency range, said first information being carried by said first message signal;

a second radio processing module for transferring said second radio signal to generate a second message signal, said second radio signal being within a second frequency range, said first frequency range being different from said second frequency range, said second message signal being of said baseband range, the highest frequency component of said baseband range being lower than the lowest frequency component of said second frequency range, said second information being carried by said second message signal;

a processing unit for processing said first message signal to generate said first information, and for processing said second message signal to generate said second information, said processing unit generating a first alarm signal corresponding to said first message signal, said processing unit generating a second alarm signal corresponding to said second message signal; and displaying means for illustrating arrivals of said first message signal and said second message signal, said displaying means showing said first information responding to said first alarm signal, said displaying means showing said second information responding to said second alarm signal.

2. Apparatus as claim 1, wherein said first radio processing module comprises:

first demodulating means for transferring a frequency of said first radio signal to within said baseband range to generate a first baseband signal; and first decoding means for decoding said first baseband signal to generate said first message signal that can be processed by said processing unit.

3. Apparatus as claim 1, wherein said second radio processing module comprises:

second demodulating means for transferring a frequency of said second radio signal to within said baseband range to generate a second baseband signal; and second decoding means for decoding said second baseband signal to generate said second message signal that can be processed by said processing unit.

4. Apparatus as claim 1, wherein said processing unit comprises:

processing means for generating said first information and said second information by processing said first message signal and said second message signal, said processing means generating said first alarm signal corresponding said first message signal, said processing means generating said second alarm signal corresponding said second message signal; and storage means for storing said first information and said second information.

5. Apparatus as claim 4, wherein said processing means is a central processing unit (CPU).

6. Apparatus as claim 4, wherein said. Storage means is a random access memory (RAM).

7. Apparatus for claim 1, said displaying means is a liquid crystal display (LCD).

8. Apparatus for communication, said apparatus receiving a first radio signal and a second radio signal being used to acquire a first information and a second information, said apparatus comprising:

a first radio processing module for transferring said first radio signal to generate a first message signal, said first radio signal being within a first frequency range, said first message signal being of a baseband range, a highest frequency component of said baseband range being lower than a lowest frequency component of said first frequency range, said first information being carried by said first message signal;

a second radio processing module for transferring said second radio signal to generate a second message signal, said second radio signal being within a second frequency range, said first frequency range being different from said second frequency range, said second message signal being of said baseband range, the highest frequency component of said baseband range being lower than the lowest frequency component of said second frequency range, said second information being carried by said second message signal;

processing means for generating said first information and said second information by processing said first message signal and said second message signal, said processing means generating a first alarm signal corresponding said first message signal, said processing means generating a second alarm signal corresponding said second message signal;

storage means for storing said first information and said second information; and displaying means for illustrating an arrival of said first message signal and said second message signal, said displaying means showing said first information responding to said first alarm signal, said displaying means showing said second information responding to said second alarm signal.

9. Apparatus as claim 8, wherein said first radio processing module comprises:

first demodulating means for transferring a frequency of said first radio signal to within said baseband range to generate a first baseband signal; and first decoding means for decoding said first baseband signal to generate said first message signal that can be processed by said processing unit.

10. Apparatus as claim 8, wherein said second radio processing module comprises:

second demodulating means for transferring a frequency of said second radio signal to within said baseband range to generate a second baseband signal; and second decoding means for decoding said second baseband signal to generate said second message signal that can be processed by said processing unit.

11. Apparatus as claim 8, wherein said processing means is a central processing unit (CPU).

12. Apparatus as claim 8, wherein said. Storage means is a random access memory (RAM).

13. Apparatus for claim 8, wherein said displaying means is a liquid crystal display (LCD).

14. A method for acquiring a first information from a first radio signal and a second information from a second radio signal, said first radio signal and said second radio signal being transformed in a space, said method comprising:

transferring said first radio signal to generate a first message signal, said first radio signal being within a first frequency range, said first message signal being of a baseband range, a highest frequency component of said baseband range being lower than a lowest frequency component of said first frequency range, said first information being carried by said first message signal;

transferring said second radio signal to generate a second message signal, said second radio signal being within a second frequency range, said first frequency range being different from said second frequency range, said second message signal being of said baseband range, the highest frequency component of said baseband range being lower than the lowest frequency component of said second frequency range, said second information being carried by said second message signal;

generating said first information and said second information by processing said first message signal and said second message signal, generating a first alarm signal corresponding said first message signal;

generating a second alarm signal corresponding said second message signal;

storing said first information and said second information; and illustrating arrivals of said first message signal and said second message signal;

showing said first information responding to said first alarm signal; and showing said second information responding to said second alarm signal.

15. The method as claim 14, wherein said method further comprises:

transferring a frequency of said first radio signal to within said baseband range to generate a first baseband signal; and decoding said first baseband signal to generate said first message signal transferring a frequency of said second radio signal to within said baseband range to generate a second baseband signal; and decoding said second baseband signal to generate said second message signal that can be processed by said processing unit.

* * * * *